Feb. 27, 1923.
J. MADSEN
LOOP COUPLING
Filed Apr. 20, 1920
1,446,714
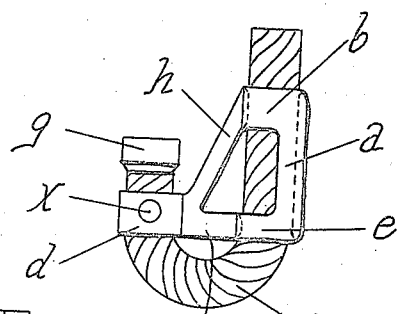
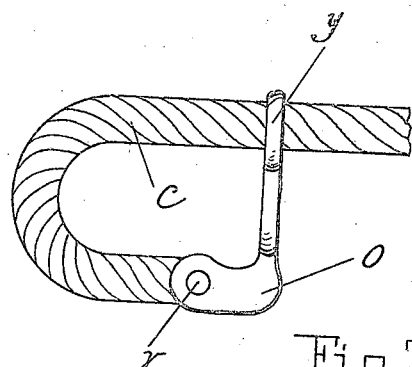
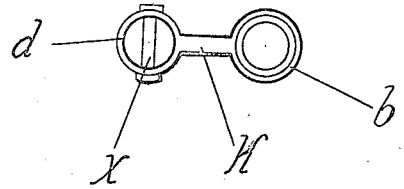
INVENTOR
Johan Madsen.
By William C. Linton
Atty.

Patented Feb. 27, 1923.

1,446,714

UNITED STATES PATENT OFFICE.

JOHAN MADSEN, OF STRIB, ISLAND OF FUNEN, DENMARK.

LOOP COUPLING.

Application filed April 20, 1920. Serial No. 375,405.

*To all whom it may concern:*

Be it known that I, JOHAN MADSEN, a subject of the King of Denmark, and a resident of Strib, Island of Funen, Denmark, have invented certain new and useful Improvements in Loop Couplings, of which the following is a specification.

The present invention relates to couplings and more particularly to a connector or coupling which when attached to ropes, cables or the like will form a slip noose or loop therein.

An object of the present invention is to provide a loop coupling of this character which may be easily and readily applied to ropes or cables and one which is extremely simple in construction, efficient in operation, and inexpensive in the cost of manufacture.

With the above and other objects in view, the invention resides in the novel features of the construction, combination and arrangement of parts as will be hereinafter more fully described, claimed and illustrated in the accompanied drawings in which:—

Figure 1 is the preferred form of a coupling embodying the invention when applied to a rope forming a slip noose or loop.

Figure 2 is an end view of the coupling as shown in Figure one, and,

Figure 3 is a slightly modified form of the invention.

Referring now more particularly to the drawings where like and corresponding parts are designated by similar reference characters throughout the several views, the letter *c* indicates a rope or cable to which the coupling embodying the present invention is applied, whereby a suitable slip noose or loop may be formed. One end of the rope is covered by means of a metallic ring *g* having its edges pressed into the rope so as to prevent this end of the rope from unraveling or fraying in any manner.

The preferred form of coupling as herein shown consists of a sleeve *d* and a pair of spaced sleeves *b* and *e* respectively, which are arranged parallel to the sleeve *d*. The sleeves *b* and *e* are connected together by means of the arm *a* and these spaced sleeves are connected to the sleeve *d* by means of the laterally extending arm *k*, and the diagonally extending rod or arm *h*. In applying this coupling to a rope or cable *c*, the rope is inserted through the bores formed within the sleeves *b* and *e* and these bores or openings of the loops *b* and *e* are slightly greater in diameter than the exterior diameter of the rope *c*, so that the rope may freely slide within the sleeves *b* and *e*. The outer ends of these bores formed within the slips *b* and *e* may be enlarged or rounded so as to prevent the rope from binding at these points or the sleeves in any manner injuring the rope, while the latter is passing therethrough. After the sleeves *b* and *e* are placed in position upon the rope, the outer end of the rope is then inserted within the bore formed within the sleeve *d* and a pin or any other suitable fastening member may be inserted through the sleeve *d* and the rope for securing this sleeve adjacent one end of the rope. After the coupling is fixed to the rope in the manner as above described the cap or ring *g* may be pressed over the end of the rope as shown.

The slightly modified form of the invention as shown in Figure 3 of the drawing consists of a single member having an L-shaped configuration in side elevation forming a longer arm in which is provided a ring *y* and through which is adapted to freely pass the rope or cable *c*. The outer end of the cable *c* is secured by means of the pin *x* to the shorter arm *o* of this coupling. By so connecting these couplings to the end of a rope or cable, the latter shapes itself to a slip noose or loop which may be easily and readily placed around various objects.

Having fully described my invention, what I claim as new and desire to secure by Letters Patent is:

1. A loop coupling for ropes comprising a long and a short section spaced apart and arranged parallel, means for permanently fixing one end of the rope in said short section and means whereby the free ends of said rope may slide through the long section substantially as and in the manner specified.

2. A loop coupling cast in a single piece of metal having an L-shaped configuration in side elevation, the long arm of said coupling having an opening therein through which may freely pass a rope, and a pin extending through the shorter arm of the coupling whereby a rope may be secured within said shorter arm.

3. A loop coupling of the character described comprising two sections, one section consisting of a pair of spaced sleeves, an arm connecting said sleeves, the other of said sections consisting of a single sleeve, and laterally extending arms connecting each sleeve of one section with the sleeve of the other section substantially as and for the purpose specified.

In testimony whereof I have hereunto set my hand.

JOHAN MADSEN.